T. SLOPER.
MANUFACTURE OF PNEUMATIC TIRES.
APPLICATION FILED MAY 5, 1920.
1,354,425.
Patented Sept. 28, 1920.
3 SHEETS—SHEET 2.
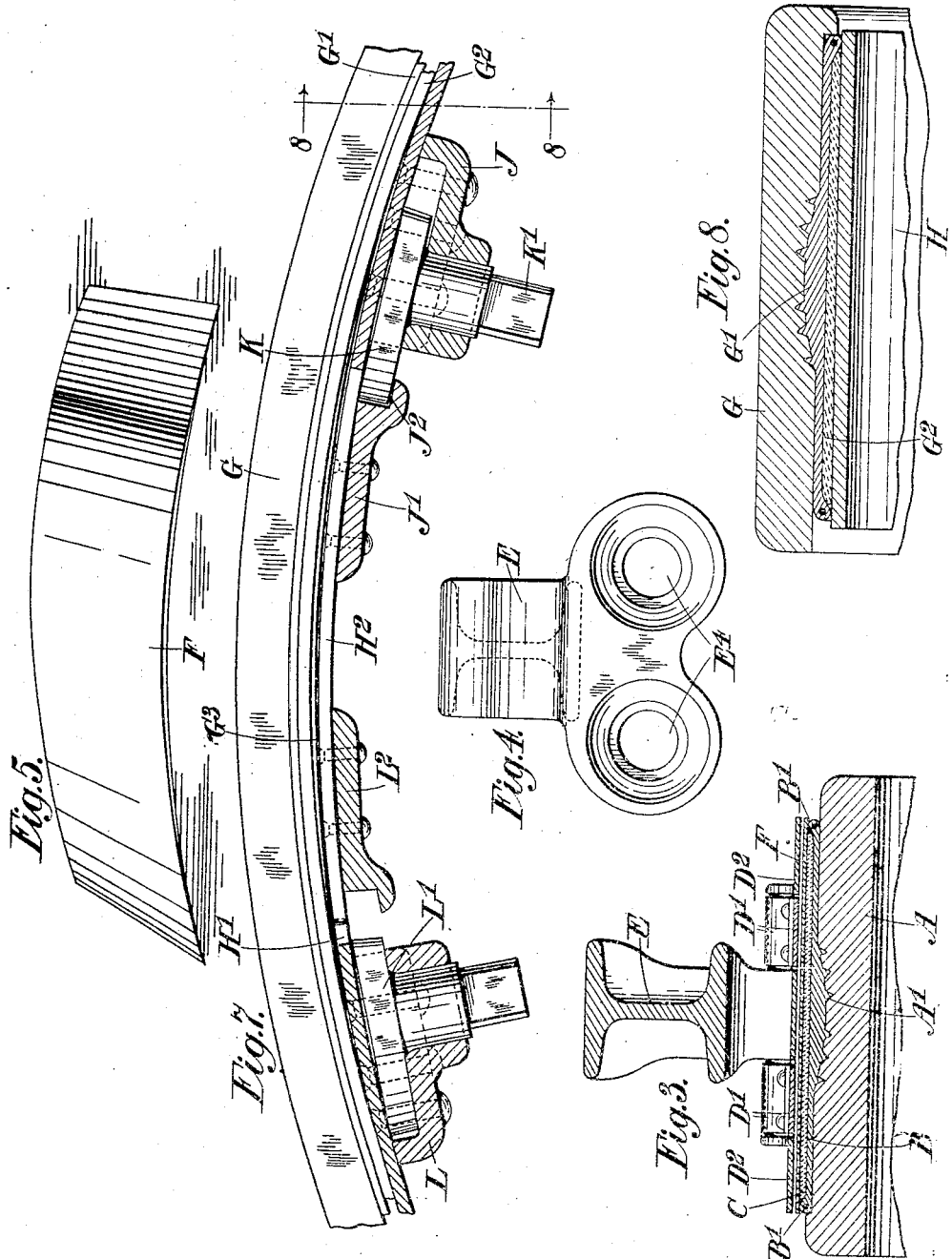

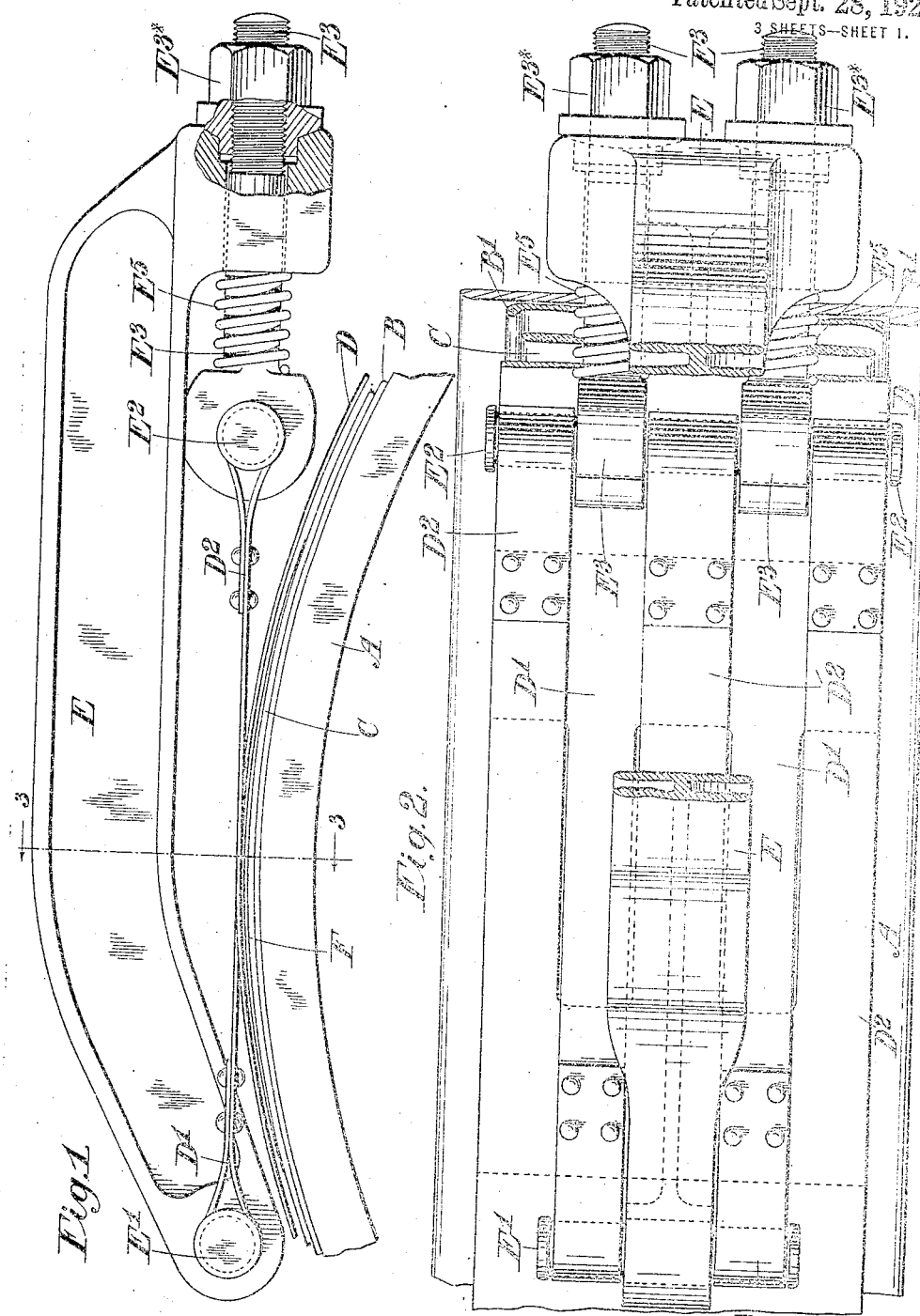

T. SLOPER.
MANUFACTURE OF PNEUMATIC TIRES.
APPLICATION FILED MAY 5, 1920.
1,354,425.
Patented Sept. 28, 1920.
3 SHEETS—SHEET 3.
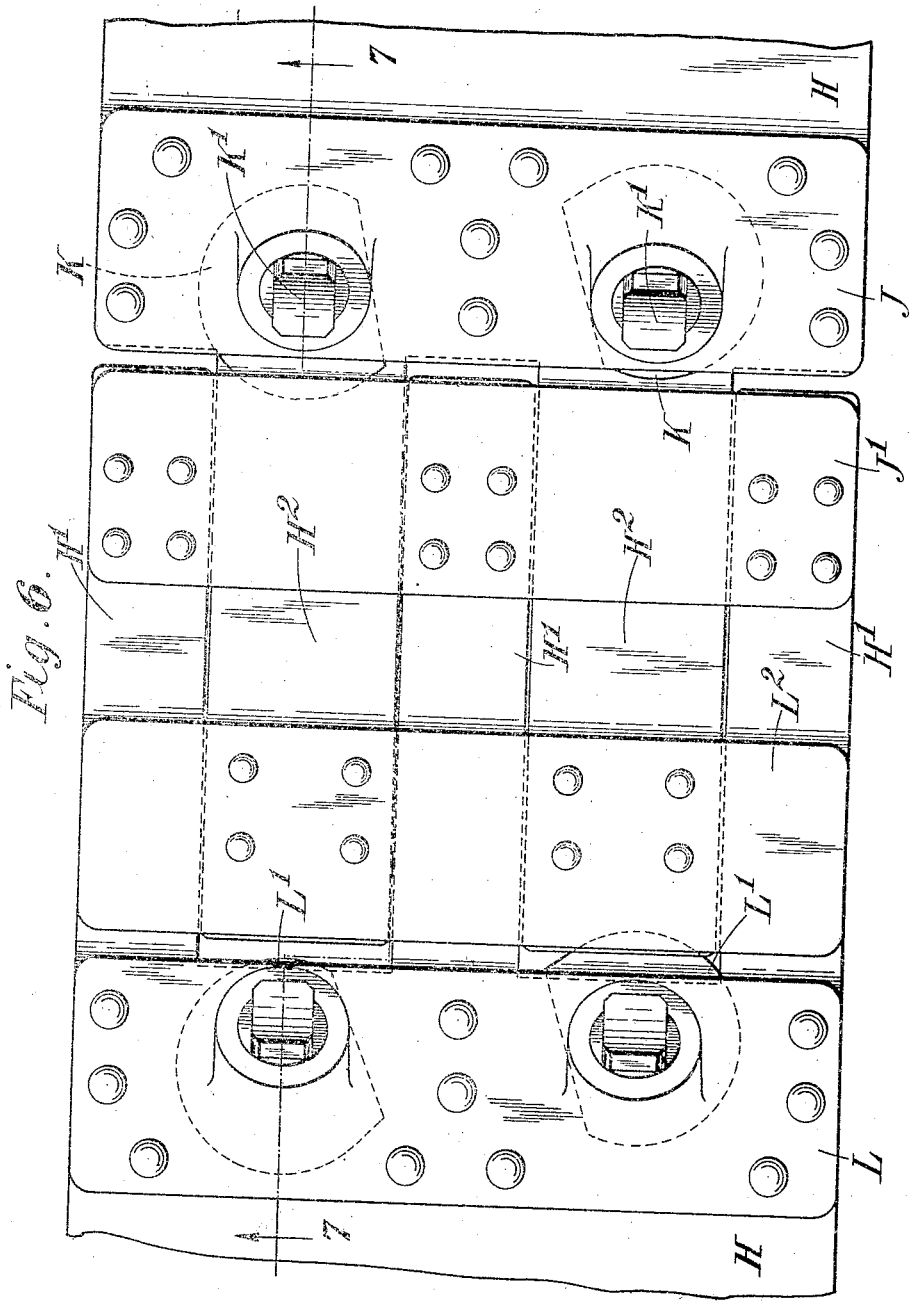
Inventor
Thomas Sloper

UNITED STATES PATENT OFFICE.

THOMAS SLOPER, OF DEVIZES, ENGLAND.

MANUFACTURE OF PNEUMATIC TIRES.

1,354,425.  Specification of Letters Patent.  Patented Sept. 28, 1920.

Application filed May 5, 1920. Serial No. 378,946.

*To all whom it may concern:*

Be it known that I, THOMAS SLOPER, a subject of the King of England, residing at Devizes, in Wiltshire, England, have invented certain new and useful Improvements in the Manufacture of Pneumatic Tires, of which the following is a specification.

This invention is for improvements in or relating to the manufacture of covers for pneumatic tires.

A well-known method of applying pressure to cycle tire-covers during vulcanization, consists in placing the cover on the outside of a metal drum or mold and wrapping the whole tightly with canvas or similar material. This process is costly because the wrapping material can only be used a limited number of times before renewal is necessary. Attempts have been made to use steel bands having their ends cramped together but the results have hitherto not been satisfactory because the radial pressure at the position where the ends of the band come together, varies from that at other parts of the band and consequently a tire so vulcanized becomes distorted during vulcanization.

Although the invention is mainly applicable to the vulcanizing of tires, it is not restricted to this, as obviously it could be used for vulcanizing any similar ring-like article, and a pressure-band for applying radial pressure to the ring-like articles during vulcanization according to this invention is of resilient material arranged to lie within or around the ring-like article, has at its ends longitudinal strips of less width than the width of the band arranged to extend past each other side-by-side, and is combined with a pressure-device for operating on the strips in such manner as to force the ends of the band in opposite directions for applying the necessary pressure.

It is found that to get the best results with the pressure-band the latter should have a smooth surface, such as for example would be provided by a band of sheet metal and between the band and the article to be vulcanized, an equalizing-band (for example a fabric band) is introduced which is of such a character as to permit slip of the pressure-band thereon so that the article is not distorted by such slip.

It is further found that when a pneumatic-tire cover supported during vulcanization on a mold or drum and having at its edges wires, is provided with a wrapping or with a pressure-band such as is indicated above, the wires tend to float sidewise in some places so that the edge of the cover is made irregular. This is due to the fact that the wires have to be loose relatively to the drum in order that the cover may be got in place, and consequently when pressure is applied to them there is a certain amount of play which is liable to be absorbed by irregular lateral displacement. To avoid this, apparatus according to this invention for the manufacture of pneumatic tire-covers wherein a mold or drum is employed to support the cover during vulcanization and the edges of the cover are provided with wires, is characterized by a pressure-equalizing band such as has been referred to above but which is so shaped as to prevent pressure upon the wires, with or without operating also as guides for the wires.

The use of the equalizing-band is also of advantage when a wrapping such as is commonly employed in present practice is used for vulcanizing instead of the pressure-band, as the equalizing-band will then serve the same purpose of relieving the wired edges from pressure.

In the accompanying drawings:—

Figure 1 is a side elevation of part of a mold with a corresponding portion of a tire-cover, equalizing-band, pressure-band, and pressure-device in position;

Fig. 2 is a plan of the parts shown in Fig. 1;

Fig. 3 is a section through the parts shown in Fig. 1 on the line 3—3;

Fig. 4 is a right-hand end view of the strut of the pressure-device as seen in Fig. 1;

Fig. 5 is a perspective view of a detail;

Fig. 6 is a plan of another form of pressure-band, the operative ends only being shown;

Fig. 7 is a section through the parts shown in Fig. 6 on the line 7—7, and

Fig. 8 is a section on the line 8—8 of Fig. 7.

The same letters indicate the same parts throughout the drawings.

The mold is indicated at A and may be in the form of a ring of metal having its outer surface shaped as shown at $A^1$, Fig. 3, to give the required form to what is finally to be an exterior of the tire-cover.

The tire-cover is indicated at B and is shown provided with wired edges B¹. Laid in the cover between the wired edges which lie proud of the main surface of the cover is an equalizing-band C. This may be of canvas and rubber and is of such thickness that its outer surface lies approximately level with the outer peripheries of the wired edges of the cover. The band is preferably endless and must then be sufficiently elastic to enable it to be got into place and removed after vulcanization, though in some cases it could be built up *in situ* on the article by a circumferential wrapping of material.

Surrounding the equalizing-band and extending beyond the same in width so that it surrounds also the wired edges of the cover C, is a steel band D whose ends are cut, one to provide two strips D¹ and the other to provide three strips D². The strips D¹, D² are of such width that laid side-by-side they make up the total width of the band and they are intercalated so that they can extend past each other in opposite directions. Thus the strips D¹ attached to one end of the band are looped at their free ends and engage a cross-pin E¹ in one end of a strut E, which strut constitutes part of the pressure-device for applying pressure to the ends of the band. The other strips D² are looped at their ends and engage a cross-pin E² which is carried from the strut E by eye-bolts E³. The eye-bolts are two in number and are arranged side-by-side. The strut lies approximately against the outer face of the band B and the eye-bolts E³ lie in line with the strips which they engage. The ends of the eye-bolts which do not carry the pin E² pass through sockets E⁴, Fig. 4, in the end of the strut E and receive nuts E³ on the other side whereby they can be adjusted. The eye-bolts are also surrounded by springs E⁵ which operate between the part of the yoke through which they extend and enlarged portions of the eye-bolts themselves near the pin E², so that they tend to thrust the bolts in such direction as to slack the band D.

It will be seen that with this arrangement, the ends of the band D are carried beyond each other in such manner that they can be pulled upon to tighten the band around the cover, and the strips enable the points at which the pressure is applied to be so chosen that the strips are made to leave the circumference of the article tangentially, so that the ends are not made to dig in as is the case when a band is merely placed around the cover and the two ends drawn together by bolts passing through blocks or ears on the same. The marking which results from such digging in is thus avoided and to still further prevent marking, a plate F is placed between the equalizing-band C and that part of the pressure-band D where the ends are intercalated. This plate is thinned off at the edges so that it does not itself present any ridge at the ends which would leave an impression in the cover.

In operating the pressure-device, one eye-bolt is first tightened up and then the other, this alternate operation being continued until a sufficient degree of pressure is obtained. It is found that by having two eye-bolts disposed on opposite sides of a line running in the longitudinal direction of the band, a greater pressure can be attained than can easily be attained with a single bolt centrally situated.

The equalizing-band C need not be employed but as has already been stated, it is found that by means of its providing a slipping surface, the pressure-band can adjust itself without disturbing the article, and further, when used with wired edges, the band can be made to serve the purpose of relieving the edges from pressure so that they are not distorted; also by the edges lying close to the said wired edges it serves as a guide to keep the wired edges in alinement and if desired it can extend beyond the wired edges, in which case it would be made of such thickness that it could be grooved to receive the said wired edges in the grooves and still provide a level surface for the pressure-band.

When the equalizing-band is used to relieve the wired edges from pressure, with or without also serving to guide them, the invention is not restricted to its use with the pressure-band only as it is within the scope of the invention to provide such a band for covers to which the necessary pressure for vulcanization is applied by a wrapping such as is commonly employed.

For vulcanizing some classes of tire, it is advantageous to apply the pressure from the inside of the tire-cover and to press the latter against the interior face of a circular mold. For this class of tire the apparatus shown in Figs. 6 to 8 may be employed. In these figures, the mold which supports the cover is shown at G, the tire at G¹, the equalizing-band at G², and the plate for preventing marking at G³. All these parts are the same as the corresponding parts already described with reference to Figs. 1 to 5. The pressure-band is shown at H and takes the form of a plain band which covers the exposed surface of the tire-cover as before and at one end is divided into three strips H¹ and at the other end into two strips H². These strips are arranged to lie side-by-side and extend past each other as with the strips of the band D, and the pressure-device comprises a cam-carrying-plate J secured to the band H near the roots of the strips H² and a coöperating cam-plate J¹ secured to the free ends of the strips H¹. In the plate J, two cams K are mounted which are provided with squares K¹ whereby they can be rotated. The cams can be brought to butt against the plate J¹ in which position they lie under a lip J² thereon.

The other end of the band has secured to it a similar cam-carrying-plate L having mounted in it two cams L¹ which coöperate with a cam-plate L² secured to the free ends of the strips H² whose root ends are attached to the opposite end of the band to that whereon the plate L is secured.

In using this band, the tire-cover G¹, equalizing-band G², and the plate G³ for preventing marking, are mounted within the mold G and then the band H is introduced. When in position, the band is forcibly expanded by the pressure-devices comprising the plates J, J¹ and L, L², the cams K and L¹ being turned for this purpose to force the plates J¹ and L² respectively away from the plates J and L respectively.

It will be seen that as the cams are arranged in pairs whereof the units lie on opposite sides of a line parallel with the longitudinal direction of the band, great pressure can be put upon the band by alternately tightening first one cam K and then the other cam K, and this can be repeated with the cams L¹.

The equalizing-band C or G² may be treated with lubricant such as graphite or French-chalk to enable the pressure-band to be slid thereon during the application of pressure.

What I claim as my invention and desire to secure by Letters Patent is:—

1. In apparatus for applying radial pressure to an annular article during its vulcanization, the combination, with an annular support, of a band of resilient material for disposing in the form of a circle co-axial with, and situated in the same general plane as the support, and having at each end a longitudinal strip of less width than the width of the band arranged to extend past each other side-by-side, and a pressure device to which the said strips are attached, which pressure device is arranged to force the strips at the two ends of the band in such opposite directions as will press the band against the support substantially as described.

2. In apparatus for applying radial pressure to an annular article during its vulcanization, the combination, with an annular support, of a band of resilient material surrounding the same and having at each end a longitudinal strip of less width than the width of the band arranged to extend past each other size-by-side, and a pressure device to which the said strips are attached which pressure device is arranged to pull the strips at the two ends of the band in opposite directions, substantially as set forth.

3. In apparatus for applying radial pressure to an annular article during its vulcanization, the combination, with an annular support, of a band of resilient material bent into the form of a circle coaxial with, and situated in the same general plane as the support, and having at each end at least one longitudinal strip of less width than the width of the band arranged to extend past each other side-by-side, the strips at one end of the band being one less in number than those at the other end and being intercalated together, and a pressure device to which the said strips are attached, which pressure device is arranged to force the strips at the two ends of the band in such opposite directions as will press the band against the support, substantially as set forth.

4. In apparatus for applying radial pressure to an annular article during its vulcanization, the combination, with an annular support, of a band of resilient material surrounding the same and having at each end a longitudinal strip of less width than the width of the band arranged to extend past each other side-by-side, and a pressure device to which the said strips are attached, which pressure device is arranged to pull the strips at the two ends of the band in opposite directions, and is so disposed relatively to the points at which it engages the strips that the free ends of the strips will leave the circumferential surface of the article tangentially thereto at the same radial plane when under tension, substantially as set forth.

5. In apparatus for applying radial pressure to an annular article during its vulcanization, the combination, with an annular support, of a band of resilient material bent into the form of a circle co-axial with, and situated in the same general plane as the support, and having at each end a longitudinal strip of less width than the width of the band arranged to extend past each other side-by-side, and a pressure device comprising a strut, and straining means carried by one end of the latter and engaging the strip at one end of the band, which strut is disposed approximately parallel to that face of the strips which is directed away from the support, and has its other end engaged with the strip at the other end of the band, and the straining means are arranged to force the strips at the two ends of the band in such opposite directions as will press the band against the support, substantially as set forth.

6. In apparatus for applying radial pressure to an annular article during its vulcanization, the combination, with an annular support, of a band of resilient material bent into the form of a circle co-axial with, and situated in the same general plane as the support, and having at each end a plurality of longitudinal strips each of less width than the width of the band arranged to extend past each other side-by-side, the strips at one end of the band being one less in number than those at the other end and being intercalated together, and a pressure device comprising a strut, and straining means carried by one end of the latter and engaging the strips at one end of the band, which strut is disposed approximately parallel to that face of the strips which is directed away from the support, and has its other end engaged with the strips at the other end of the band, and the straining means are arranged to force the said strips at the two ends of the band in such opposite directions as will press the band against the support, substantially as set forth.

7. In apparatus for applying radial pressure to an annular article during vulcanization, the combination, with an annular support, of a band of resilient material bent into the form of a circle co-axial with, and situated in the same general plane as the support, and having at each end at least one longitudinal strip of less width than the width of the band arranged to extend past each other side-by-side, the strips at one end being one less in number than those at the other end and being intercalated together, and a pressure device comprising a strut and a plurality of straining devices mounted on one end of the latter and engaging each one strip at one end of the band, which strut has its other end engaged with the one or more strips at the other end of the band, the said straining devices being situated half on either side of a line extending in the direction of the length of the band and so arranged as to force the strips at the two ends of the bands in such opposite directions as will press the band against the support, substantially as set forth.

8. Apparatus for applying radial pressure to an annular article during its vulcanization, comprising in combination an annular support, a band of resilient material surrounding the same and having at one end one longitudinal strip and at its other end a pair of longitudinal strips spaced apart to receive the former strip between them, which strips are each of less width than the width of the band and extend past each other side-by-side, and a pressure device comprising a strut having one end attached to the former strip, and two straining devices mounted on the other end of the strut and engaging each one of said pair of strips and disposed each in line with the strip to which it is engaged, and arranged to force the strips at the two ends of the band apart in opposite directions, substantially as set forth.

9. Apparatus for applying radial pressure to an annular article during its vulcanization, comprising in combination an annular support, a pressure band of resilient material bent into the form of a circle co-axial with, and situated in the same general plane as the support, and having at each end a longitudinal strip of less width than the width of the band arranged to extend past each other side-by-side, an equalizing band interposed between said pressure band and said support, the face of the equalizing band next to the pressure band constituting a slipping surface for the pressure band, and a pressure device to which the said strips are attached, which pressure device is arranged to force the strips at the two ends of the pressure band in such opposite directions as will press the pressure band against the support, substantially as set forth.

10. In apparatus for applying radial pressure to an annular article during its vulcanization, the combination, with an annular support, of a band of resilient material bent into the form of a circle co-axial with and situated in the same general plane as the support, and having at each end a longitudinal strip of less width than the width of the band arranged to extend past each other side-by-side, a pressure device to which the said strips are attached, which pressure device is arranged to force the strips at the two ends of the band in such opposite directions as will press the band against the support, and a pressure-distributing plate interposed between the support and the band at the point where the ends of the band meet, substantially as set forth.

11. Apparatus for applying radial pressure to an annular article during its vulcanization, comprising in combination an annular support, a pressure band of resilient material bent into the form of a circle co-axial with, and situated in the same general plane as the support, and having at each end a longitudinal strip of less width than the width of the band arranged to extend past each other side-by-side, an equalizing band interposed between said pressure band and said support, the face of the equalizing band next to the pressure band constituting a slipping surface for the pressure band, a pressure device to which the said strips are attached, which pressure device is arranged to force the strips at the two ends of the pressure band in such opposite directions as will press the pressure band against the support, and a pressure-distributing plate interposed between the pressure band and the equalizing band at the point where the ends of the pressure band meet, substantially as set forth.

12. In apparatus for applying radial pressure to a pneumatic tire-cover having wired edges, the combination, with an annular support for the tire-cover, and pressure-applying means for radially pressing the cover against the support, of a pressure-equalizing band interposed between the support and said pressure-applying means for application to that surface of the cover which faces away from the support, which pressure-equalizing band is so shaped that it is adapted to relieve the wired edges from the pressure of the said pressure-applying means, substantially as set forth.

13. In apparatus for applying radial pressure to a pneumatic tire-cover having wired edges, the combination, with an annular support for the tire cover, and pressure-applying means for radially pressing the cover against the support, of a pressure-equalizing band interposed between the support and said pressure-applying means for application to that surface of the cover which faces away from the support, which pressure-equalizing band is so shaped that it is adapted to relieve the wired edges from the pressure of the said pressure-applying means, and also to constitute a guide for the said edges to keep them in alinement, substantially as set forth.

14. Apparatus for applying radial pressure to a pneumatic tire-cover during its vulcanization, comprising in combination an annular mold, a steel band surrounding the mold and having at one end one longitudinal strip and at its other end a pair of longitudinal strips spaced apart to receive the former strip between them, which strips are each of less width than the width of the band, an equalizing band interposed between said steel band and said mold, a pressure-distributing plate interposed between said steel band and said equalizing band at the point where the ends of the steel band meet, and a pressure device comprising a strut having one end engaged by said one strip at one end of the band, and having two lugs at its other end and two eye-bolts mounted one in each of said lugs, and engaged with said pair of strips at the other end of the steel band, substantially as set forth.

In testimony whereof I affix my signature.

THOMAS SLOPER.